(12) United States Patent
Haut et al.

(10) Patent No.: US 8,955,868 B2
(45) Date of Patent: Feb. 17, 2015

(54) INFANT STROLLER APPARATUS

(71) Applicant: Wonderland Nurserygoods Company Limited, Central Hong Kong (HK)

(72) Inventors: Robert E. Haut, West Chester, PA (US); Andrew J. Taylor, Mohnton, PA (US); Curtis M. Hartenstine, Birdsboro, PA (US); Dylan A. Mellinger, Narvon, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 13/855,791

(22) Filed: Apr. 3, 2013

(65) Prior Publication Data

US 2013/0264798 A1    Oct. 10, 2013

Related U.S. Application Data (60) Provisional application No. 61/686,450, filed on Apr. 5, 2012.

(51) Int. Cl.
*B62B 7/06* (2006.01)

(52) U.S. Cl.
CPC ........................................ *B62B 7/06* (2013.01)
USPC ............................ 280/647; 280/639; 280/650

(58) Field of Classification Search
USPC ..................... 280/647, 639, 650; 403/91–102
See application file for complete search history.

(56) References Cited

U.S. PATENT DOCUMENTS

| | | | | |
|---|---|---|---|---|
| 4,191,397 A | * | 3/1980 | Kassai | 280/647 |
| 4,216,974 A | * | 8/1980 | Kassai | 280/42 |
| 4,828,278 A | * | 5/1989 | Shinroku et al. | 280/644 |
| 5,181,735 A | * | 1/1993 | Onishi | 280/642 |
| 5,669,623 A | * | 9/1997 | Onishi | 280/642 |
| 5,752,738 A | * | 5/1998 | Onishi et al. | 297/61 |
| 6,086,086 A | * | 7/2000 | Hanson et al. | 280/650 |

(Continued)

FOREIGN PATENT DOCUMENTS

| | | |
|---|---|---|
| EP | 2426029 A3 | 7/2013 |
| FR | 2833552 A1 | 6/2003 |

(Continued)

OTHER PUBLICATIONS

Merriam-Webster Dictionary (online) definition of "match" retrieved Mar. 27, 2014.*

*Primary Examiner* — J. Allen Shriver, II
*Assistant Examiner* — Steve Clemmons
(74) *Attorney, Agent, or Firm* — David I. Roche; Baker & McKenzie LLP (57) ABSTRACT

An infant stroller apparatus includes a rear leg frame including a first side segment, a handle having a second side segment, and a hinge structure assembled with the first and second side segments. The hinge structure includes a first and a second coupling part, and a latch. The first coupling part is pivotally connected with the first side segment. The second coupling part is affixed with the second side segment and is pivotally connected with the first coupling part. The latch is operable to lock the first coupling part with the second coupling part to block rotation of the second coupling part relative to the first coupling part about the second pivot axis. When the stroller apparatus is in a deployed state, a distal end of the second coupling part faces a rear surface of the first side segment, and the latch engages with the first coupling part at a location above the distal end.

16 Claims, 8 Drawing Sheets

(56) References Cited

U.S. PATENT DOCUMENTS

| | | | |
|---|---|---|---|
| 6,238,125 B1* | 5/2001 | Lin | 403/102 |
| 6,267,405 B1* | 7/2001 | Chen | 280/647 |
| 6,416,077 B1* | 7/2002 | Chen et al. | 280/642 |
| 6,485,216 B1* | 11/2002 | Cheng | 403/102 |
| 6,581,957 B1* | 6/2003 | Lan | 280/642 |
| 6,666,473 B2* | 12/2003 | Hartenstine et al. | 280/647 |
| 6,851,700 B2* | 2/2005 | Yoshie et al. | 280/642 |
| 6,921,102 B2* | 7/2005 | Hsia | 280/642 |
| 6,964,429 B2* | 11/2005 | Suga et al. | 280/642 |
| 6,979,017 B2* | 12/2005 | Chen | 280/642 |
| 7,140,634 B2* | 11/2006 | Kassai et al. | 280/642 |
| 7,686,322 B2* | 3/2010 | Longenecker et al. | 280/642 |
| 7,942,159 B2* | 5/2011 | Choi | 135/120.3 |
| 8,635,743 B2* | 1/2014 | Smith et al. | 16/382 |
| 2002/0131814 A1* | 9/2002 | Hou et al. | 403/97 |
| 2002/0197102 A1* | 12/2002 | Cheng | 403/102 |
| 2003/0075902 A1* | 4/2003 | Hsia | 280/647 |
| 2005/0225055 A1 | 10/2005 | Dotsey et al. | |
| 2005/0242549 A1* | 11/2005 | Longenecker et al. | 280/642 |
| 2005/0258620 A1* | 11/2005 | Pike et al. | 280/647 |
| 2009/0127828 A1 | 5/2009 | Longenecker et al. | |
| 2011/0133418 A1* | 6/2011 | Li | 280/47.38 |
| 2012/0110785 A1* | 5/2012 | Hanigan | 16/367 |
| 2012/0242062 A1* | 9/2012 | Schroeder et al. | 280/650 |
| 2013/0207369 A1* | 8/2013 | Pollack | 280/650 |

FOREIGN PATENT DOCUMENTS

| | | |
|---|---|---|
| GB | 2402652 A | 12/2004 |
| JP | 2003118584 A | 4/2003 |

* cited by examiner

INFANT STROLLER APPARATUS

CROSS-REFERENCE TO RELATED APPLICATION

This application claims priority to U.S. Provisional Patent Application No. 61/686,450 which was filed on Apr. 5, 2012, and which is incorporated herein by reference.

BACKGROUND

1. Field of the Invention

The present inventions relate to infant stroller apparatuses.

2. Description of the Related Art

Foldable stroller apparatuses are often used by parents and caregivers to transport a child or children. Because the child interact with the stroller apparatus regularly, it is important that the stroller to be safe. Most stroller apparatuses have hinge joints and latching mechanisms that are exposed, which increases the risk of having the finger or hand of the child caught while the stroller apparatus is folded or unfolded.

Some current construction consists in having a handle of the stroller frame to rest on the rear leg. For covering the region where the handle and the rear leg come together, very large shielding or expanding parts are usually required to prevent accidental hand or finger pinching, which may be detrimental to the outer appearance.

Therefore, there is a need for an infant stroller apparatus that can address at least the foregoing issues.

SUMMARY

The present application describes an infant stroller apparatus that can be safe in use and aesthetically pleasing. In one embodiment, the infant stroller apparatus can include a rear leg frame including a first side segment, a handle having a second side segment extending along a lengthwise axis, and a hinge structure assembled with the first and second side segments. The hinge structure can include a first and a second coupling part, and a latch. The first coupling part is pivotally connected with the first side segment about a first pivot axis. The second coupling part can be affixed with the second side segment and pivotally connected with the first coupling part about a second pivot axis that is spaced apart from the first pivot axis, wherein the second coupling part has a distal end. The latch is operable to lock the first coupling part with the second coupling part to block rotation of the second coupling part relative to the first coupling part about the second pivot axis. When the stroller apparatus is in a deployed state, the distal end of the second coupling part faces a rear surface of the first side segment, and the latch engages with the first coupling part at a location above the distal end.

At least one advantage of the structures described herein includes the ability to provide a hinge structure in which the internal latch can lock without interacting with the rear leg frame. Since the internal latch of the hinge structure is entirely concealed within the coupling parts, the hinge structure can be safer in use.

DETAILED DESCRIPTION OF THE EMBODIMENTS

Figure 1:
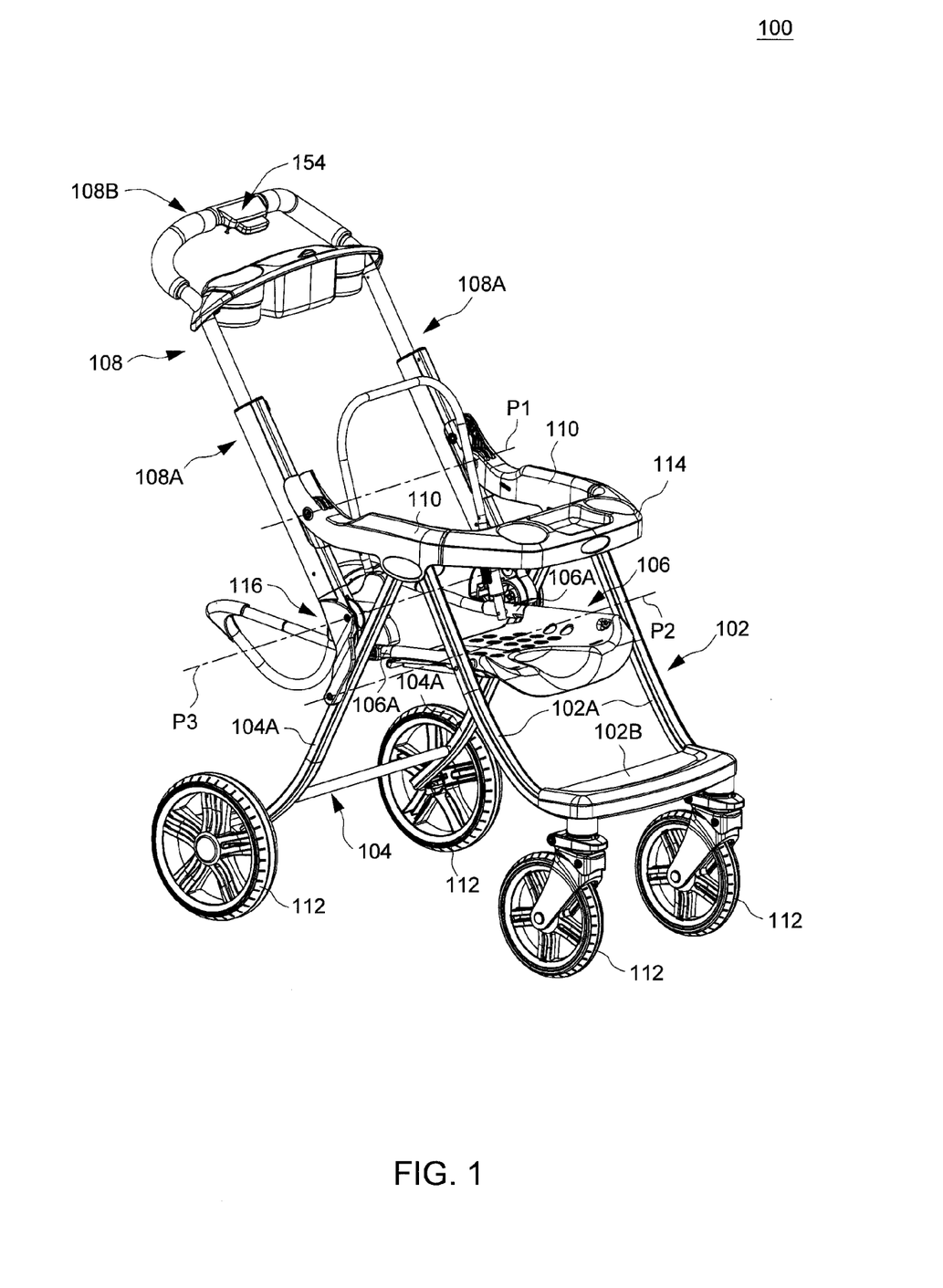
FIG. 1 is a perspective view illustrating an embodiment of an infant stroller apparatus.

FIG. 1 is a schematic view illustrating an embodiment of an infant stroller apparatus 100. The infant stroller apparatus 100 can include the assembly of multiple frame portions that are operable to fold to a collapsed state for convenient storage and transportation, and unfold to a deployed state for use. The frame portions can include a front leg frame 102, a rear leg frame 104, a seat frame 106, a handle 108, and left and right armrests 110. The front leg frame 102 can have a U-shaped formed by the assembly of tubular segments, including left and right side segments 102A, and a transversal segment 102B connected with lower portions of the two side segments 102A. The rear leg frame 104 can also include left and right side segments 104A. Lower ends of the front and rear leg frames 102 and 104 can be respectively connected with a plurality of wheels 112.

The seat frame 106 can include a left and a right side bar 106A that extend from a rear toward a front of the child stroller apparatus 100. At each of the left and right sides, the side bar 106A can be pivotally connected with the side segment 102A of the front leg frame 102 and the side segment 104A of the rear leg frame 104 at two spaced-apart pivot points, respectively. The seat frame 106 can provide support for a seat board on which a child can be installed.

The two armrests 110 can be disposed vertically above the seat frame 106, and can extend lengthwise from the rear toward the front. At each of the left and right sides, the armrest 110 can have a rear end portion pivotally connected with the handle 108, and a front end portion affixed with a transverse segment 114 which can serve as a front table or guard member. Moreover, a middle region of each armrest 110 can be pivotally connected with the upper ends of the side segments 102A and 104A of the front and rear leg frames 102 and 104, respectively.

The handle 108 can have a U-shape including left and right side segments 108A, and a transversal segment 108B connected with the two side segments 108A. At each of the left and right sides, the side segment 108A of the handle 108 can be pivotally connected with the rear end portion of the armrest 110 about a pivot axis P1. Moreover, lower end portions of the two side segments 108A of the handle 108 can be respectively connected with the two side segments 104A of the rear leg frame 104 via two hinge structures 116. The two hinge structures 116 can be identical in construction.

Figure 2:
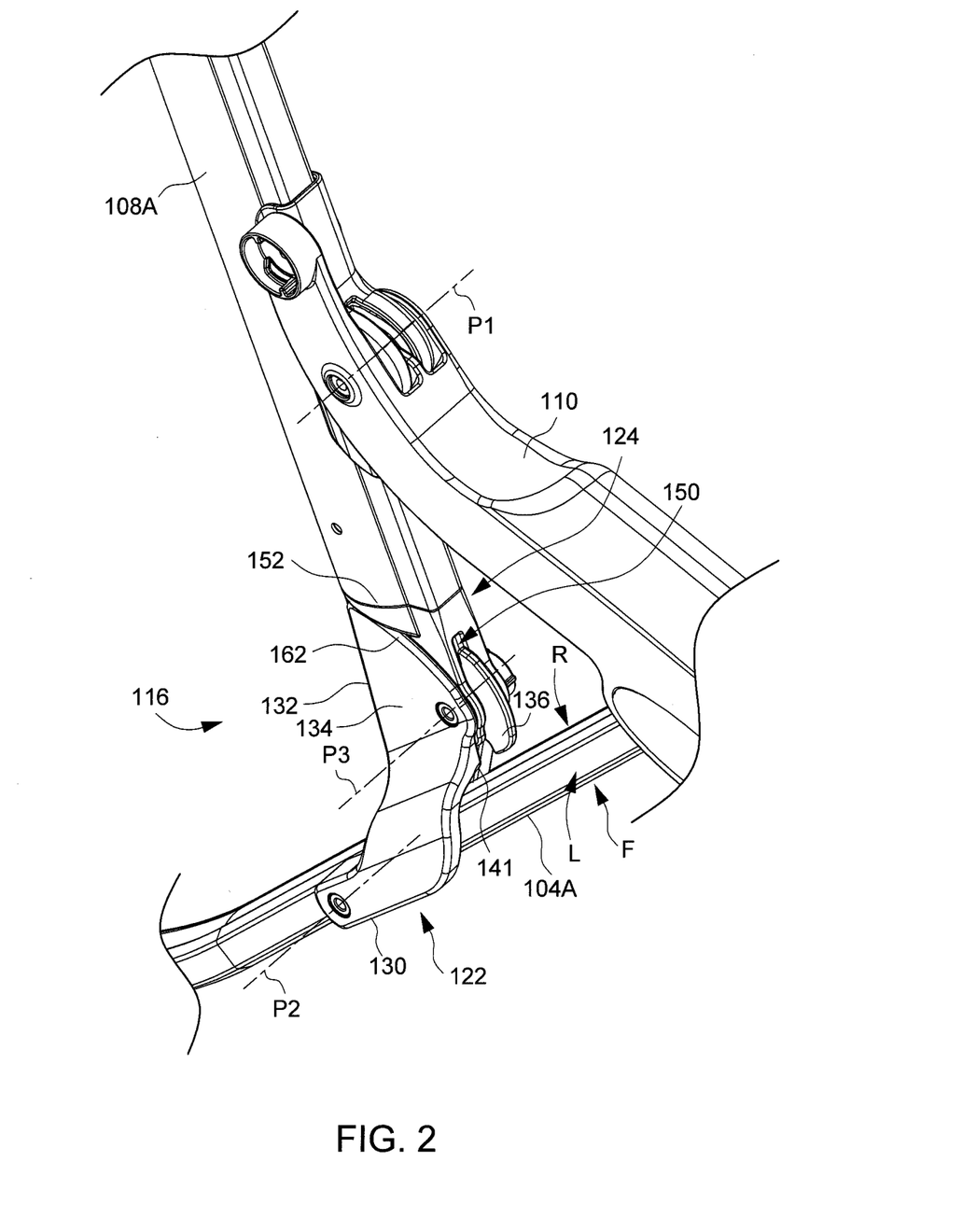
FIG. 2 is an enlarged view illustrating one hinge structure for connecting a handle with a rear leg frame of the infant stroller apparatus.
Figure 3:
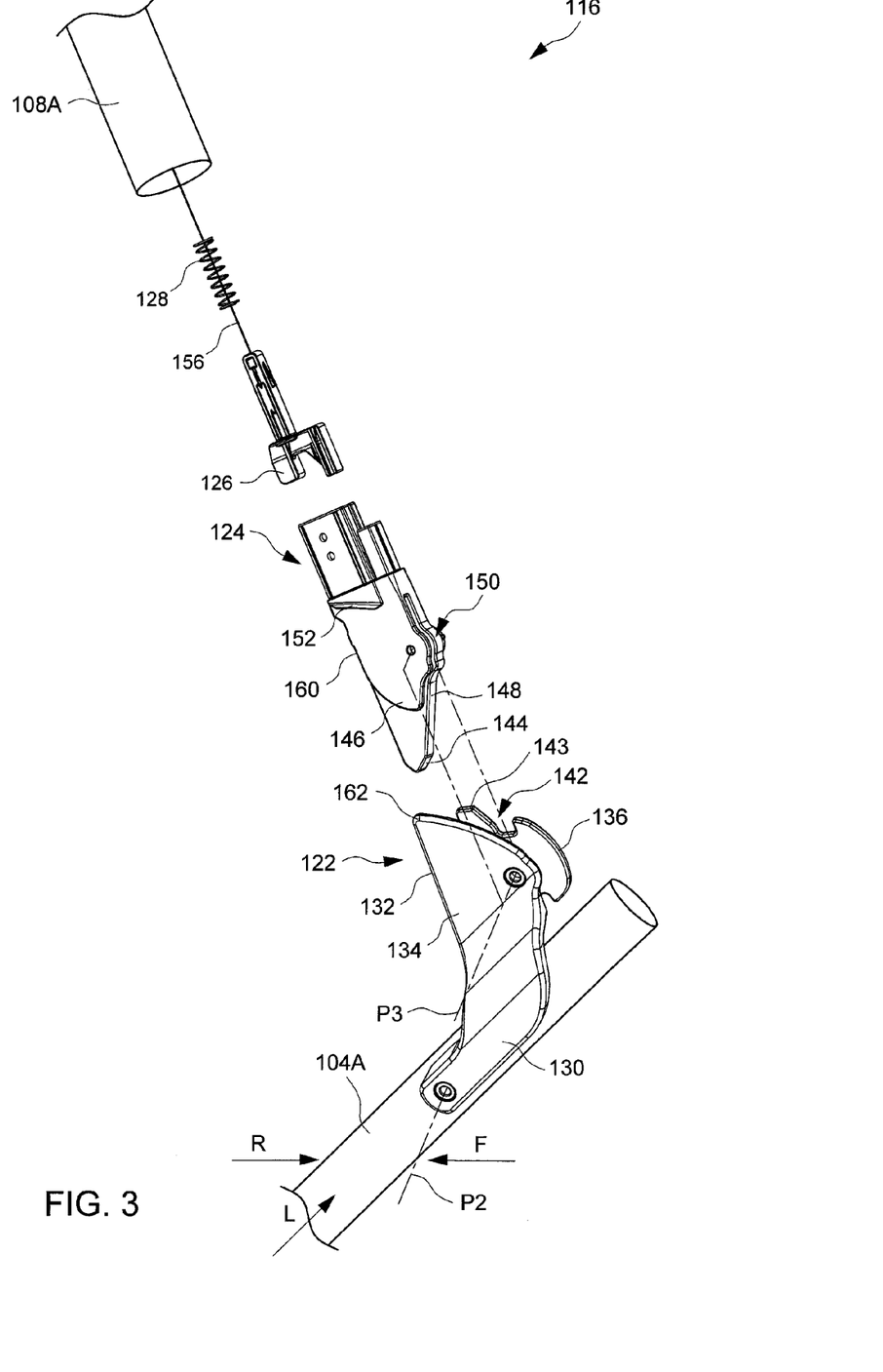
FIG. 3 is an exploded view of the hinge structure.
Figure 4:
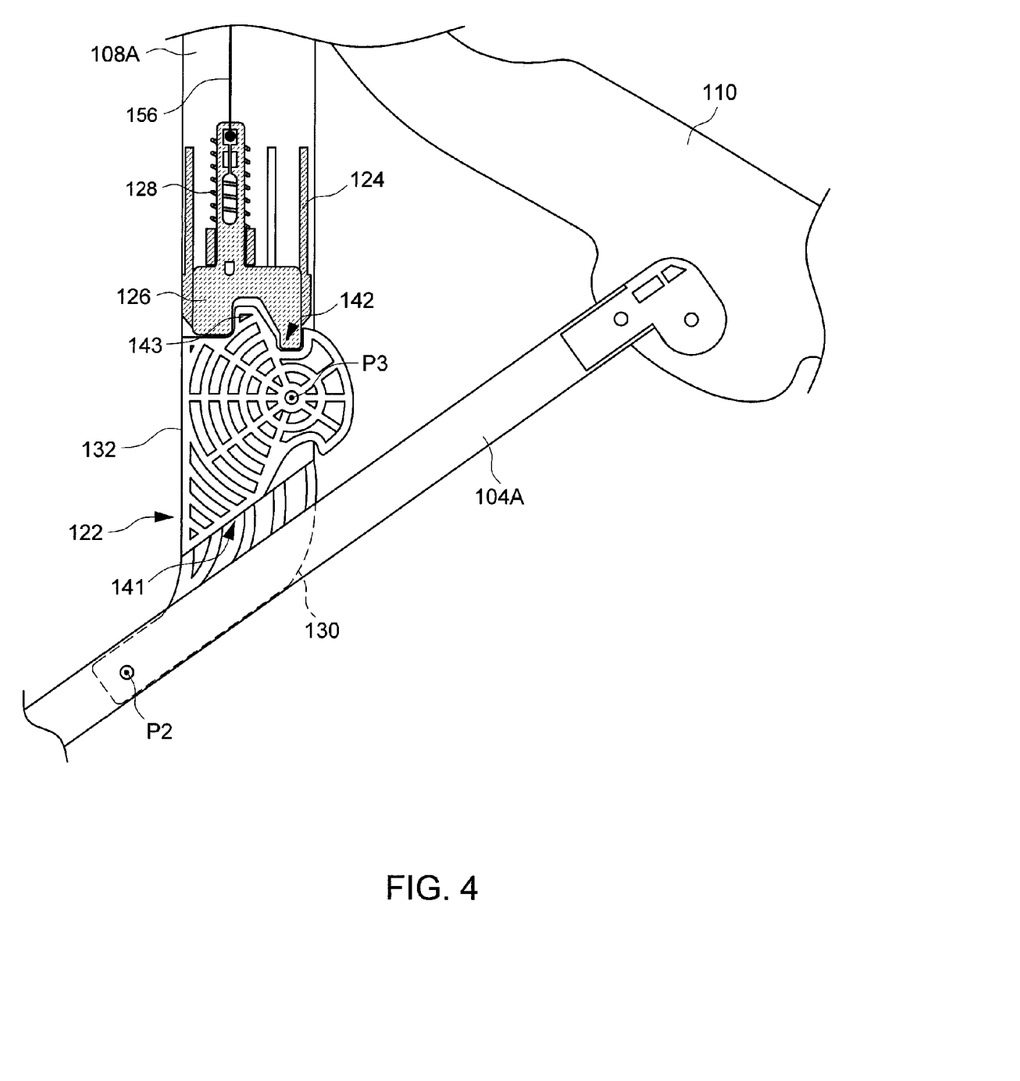
FIG. 4 is a schematic cross-sectional view illustrating the assembly of the hinge structure.

FIG. 2 is an enlarged view illustrating one hinge structure 116, FIG. 3 is an exploded view of the hinge structure 116, and FIG. 4 is a schematic view illustrating the assembly of the hinge structure 116. The hinge structure 116 can include a first coupling part 122, a second coupling part 124, a latch 126 and a spring 128. The first coupling part 122 can be pivotally connected with one side segment 104A of the rear leg frame 104 about a pivot axis P2. The second coupling part 124 can be affixed with the side segment 108A of the handle 108, and can be pivotally connected with the first coupling part 122 about a pivot axis P3 spaced apart from the pivot axis P2. The latch 126 can be assembled adjacent to the first and second coupling parts 122 and 124, and can be operable to lock and unlock the second coupling part 124 with respect to the first coupling part 122 to either block or allow rotation of the second coupling part 124 relative to the first coupling part 122 about the pivot axis P3.

In conjunction with FIGS. 2-4, FIG. 5 is a schematic view illustrating the first coupling part 122. The first coupling part 122 can be formed integrally by plastic molding. The first coupling part 122 can include two elongated portions 130 and 132 connected with each other, and extending at an inclined angle relative to each other. The portion 130 can have a distal end pivotally connected with the side segment 104A of the rear leg frame 104 about the pivot axis P2. The portion 132 can include two spaced-apart and substantially parallel sidewalls 134 and 136 that are joined with a stop surface 138 at one side. The sidewalls 134 and 136 and the stop surface 138 can delimit at least partially a slot 140 through which the second coupling part 124 can be assembled.

Figure 5:
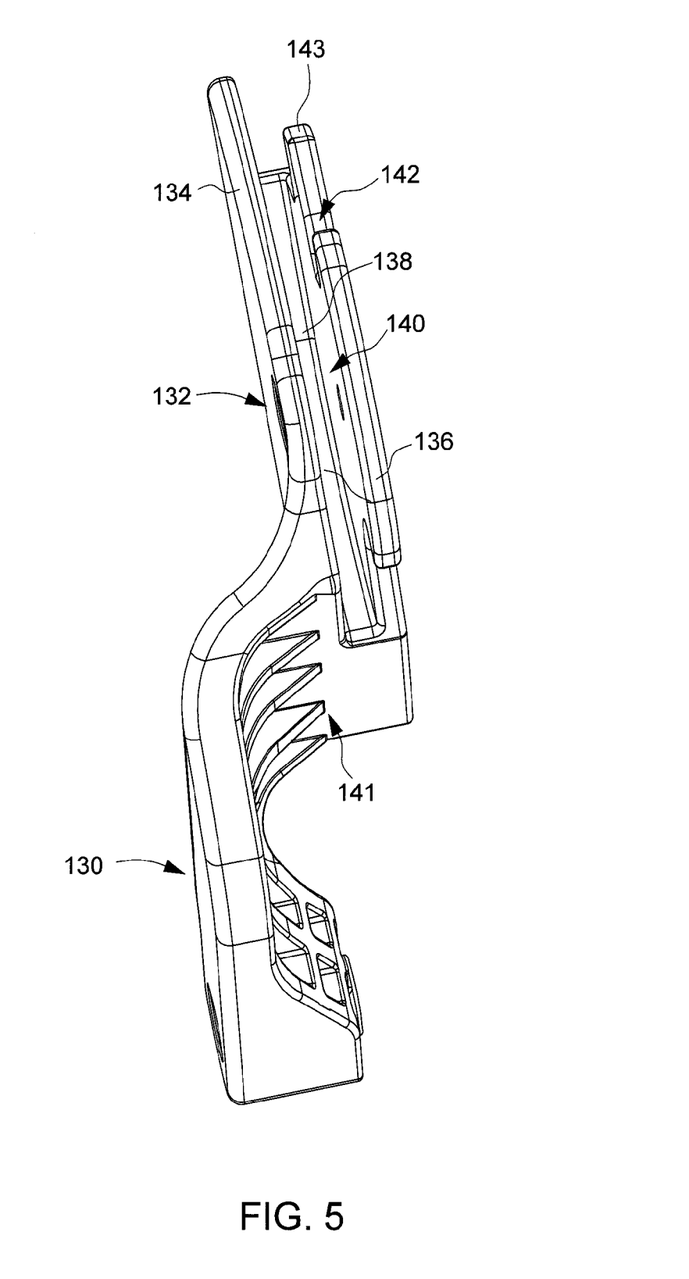
FIG. 5 is a schematic view illustrating one coupling part used in the hinge structure.

The portion 132 can also include a wrapping surface 141 that can project from the portion 130 in a direction parallel to the pivot axis P3. An edge of the sidewall 136 opposite to that of the wrapping surface 141 can include a locking groove 142 for engagement of the latch 126, and a protruding finger 143 adjacent to the locking groove 142.

Referring to FIG. 3, the second coupling part 124 can be affixed with a distal end of the side segment 108A of the handle 108. The second coupling part 124 can have an elongated shape that extends along the lengthwise axis of the side segment 108A, and terminates with a distal end 144. The second coupling part 124 can also include two spaced-apart and substantially parallel sidewalls 146 and 148 that delimit at least partially a slot 150 that extends inward. A protruding flange 152 can be disposed at one side of the sidewall 146. The position of the pivot axis P3 can be located between the flange 152 and the distal end 144 along a lengthwise axis of the side segment 108A.

The latch 126 and the spring 128 can be assembled with the second coupling part 124. The latch 126 can be disposed adjacent to a side of the slot 150 that is opposite to that of the distal end 144. The spring 128 can be respectively connected with the latch 126 and the second coupling part 124, and can bias the latch 126 toward a side of the slot 150 or the distal end 144 to engage with the locking groove 142. Moreover, the latch 126 can be operatively connected via a cable 156 with an actuator 154 (better shown in FIG. 1) arranged on the transversal segment 108B of the handle 108.

When the first and second coupling parts 122 and 124 are assembled with each other, the sidewall 146 can be arranged in the slot 140 between the sidewalls 134 and 136, and the sidewall 136 can be arranged in the slot 150 in a sandwiched manner. A pivot member (e.g., a rivet) can be engaged through the sandwiched structure to define the pivot axis P3 about which the second coupling part 124 can rotate relative to the first coupling part 122. The side segment 104A of the rear leg frame 104 can have a rear surface R, a front surface F, and two opposite lateral surfaces L. The first coupling portion 122 can be pivotally connected with the side segment 104A adjacent to one of the two lateral surfaces L (e.g., the outer one facing an outside of the stroller apparatus as shown in FIG. 2). The first and second coupling parts 122 and 124 can respectively rotate about the pivot axes P2 and P3 in a concurrent manner when the stroller apparatus 100 is folded to a collapsed state and unfolded to a deployed state.

In conjunction with FIGS. 2-4, FIGS. 6 and 7 are schematic views illustrating different states of the hinge structure 116. When the stroller apparatus 100 is in a deployed state for use as shown in FIG. 1, the side segment 108A of the handle 108 at each of the left and right sides can extend in a direction that is substantially aligned with the extending direction of the portion 132 of the first coupling part 122. The stop surface 138 can abut against an edge 160 of the sidewall 146 in the second coupling part 124, and an edge 162 of the sidewall 134 in the first coupling part 122 can abut against the flange 152. The foregoing abutments can prevent downward rotation of the handle 108, and properly stop the handle at the deployed state. Moreover, the latch 126 can engage with the locking groove 142 at a position above the pivot axis P3 and the distal end 144. When the latch 126 is in the locking state, the pivot axis P3 can be located vertically between the position where the latch 126 engages with the first coupling part 122 and the pivot axis P2. As shown in FIG. 4, the latch 126 may also include a recess into which the finger 143 of the first coupling part 122 can engage to further secure the attachment of the latch 126. With the above arrangement, the handle 108 can be securely held in place relative to the rear leg frame 104 in the deployed state.

In the deployed state of the stroller apparatus 100, the wrapping surface 141 of each first coupling part 122 can also wrap at least partially around the corresponding side segment 104A toward the rear surface R thereof. The distal end 144 of the second coupling part 124 can lie substantially adjacent to or even contact with the rear surface R of the side segment 104A.

Figure 6:
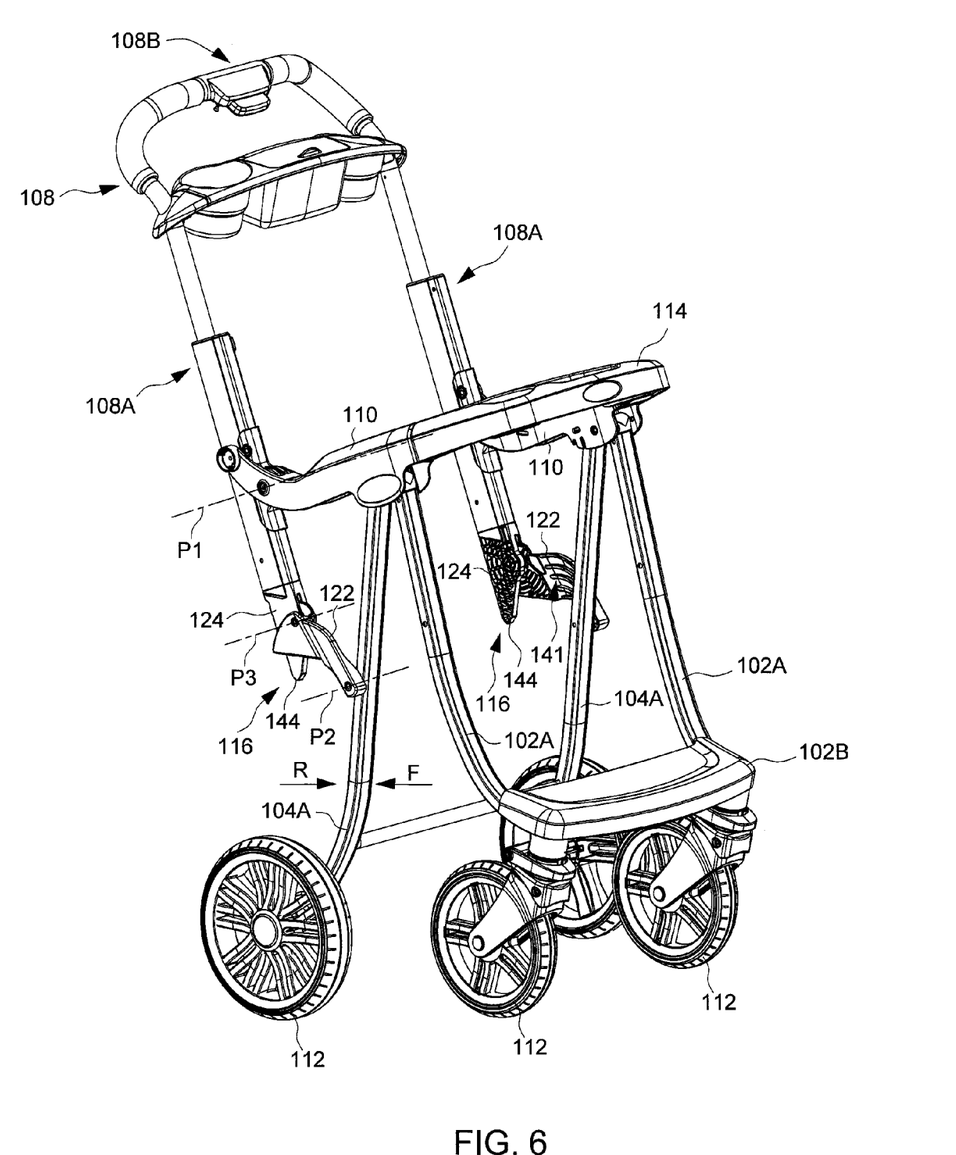
FIG. 6 is a schematic view illustrating the hinge structure when the infant stroller apparatus is in an intermediate folding state.
Figure 7:
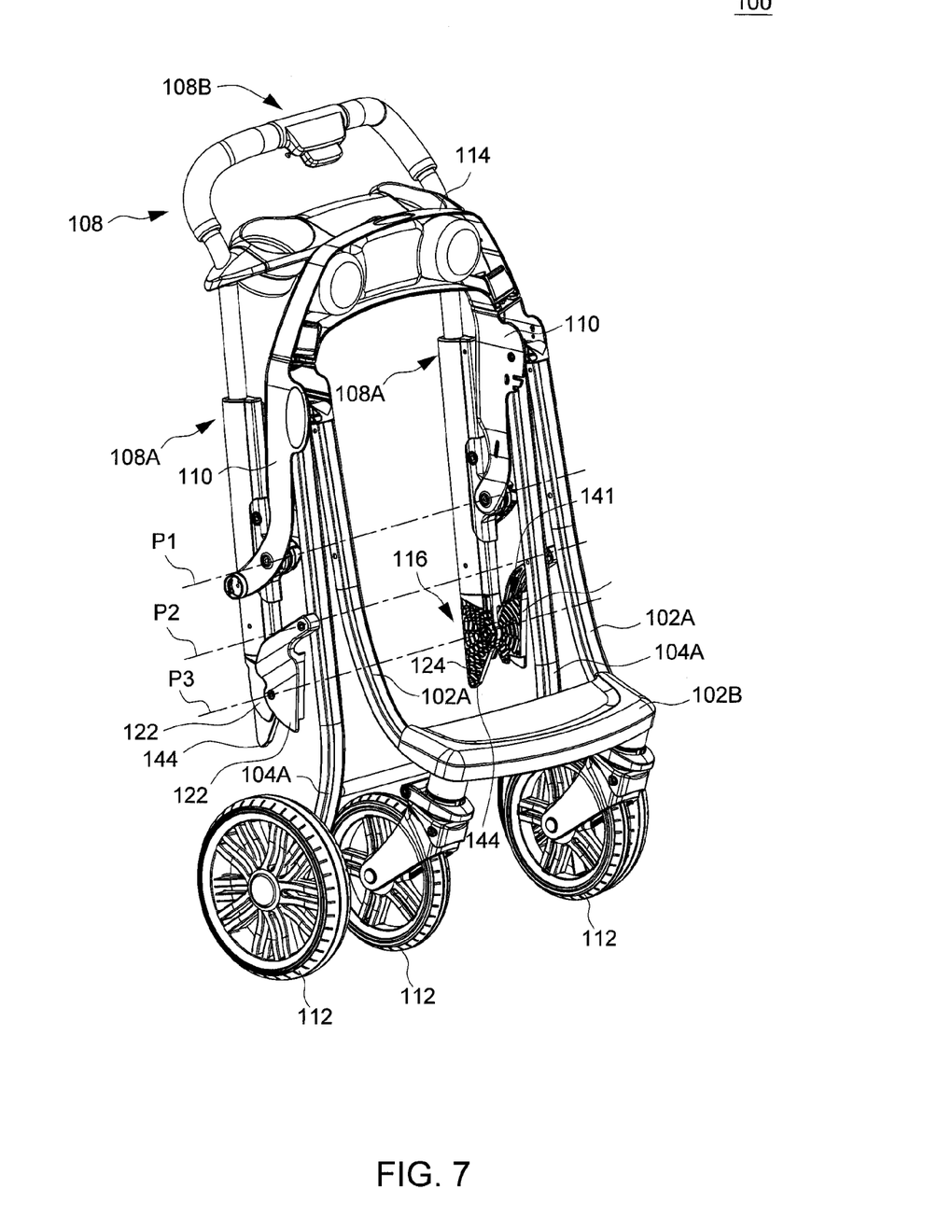
FIG. 7 is a schematic view illustrating the hinge structure when the infant stroller apparatus is in a fully collapsed state.

Referring to FIGS. 6 and 7, for collapsing the stroller apparatus 100, the actuator 154 can operated to move and disengage the latch 126 from the locking groove 142. The unlocked handle 108 (including the second coupling parts 124) then can be rotated forward about the pivot axis P3 relative to the first coupling parts 122 toward a vertical position, which drives the distal end 144 to rotate away from the rear surface R of the side segment 104A at each of the left and right sides of the rear leg frame 104, and causes rotation of the armrests 110 about the pivot axis P1. As a result, the front and rear leg frames 102 and 104 fold toward each other, and the first coupling parts 122 also concurrently rotate relative to the rear leg frame 104 about the pivot axis P2. FIG. 6 shows the hinge structure 116 when the infant stroller apparatus 100 is folded at an intermediate state, and FIG. 7 shows the hinge structure 116 when the infant stroller apparatus 100 is in the fully collapsed state. When the infant stroller apparatus 100 is fully collapsed, the handle 108 can lie substantially parallel to the rear leg frame 104.

When the stroller apparatus 100 is to be unfolded for use, the handle 108 can be rotated reversely toward the rear about the pivot axis P3. As a result, the front and rear leg frames 102 and 104 can unfold apart from each other, and the first coupling parts 122 can also concurrently rotate about the pivot axis P2 relative to the rear leg frame 104. The stroller apparatus 100 can reach the deployed state once the edge 160 of the sidewall 146 in the second coupling part 124 abuts adjacent to the stop surface 138 of the first coupling part 122, and the edge 162 of the sidewall 134 in the first coupling part 122 comes into contact with the flange 152. The latch 126 then can be biased by the spring 128 to engage with the locking groove 142.

Figure 8:
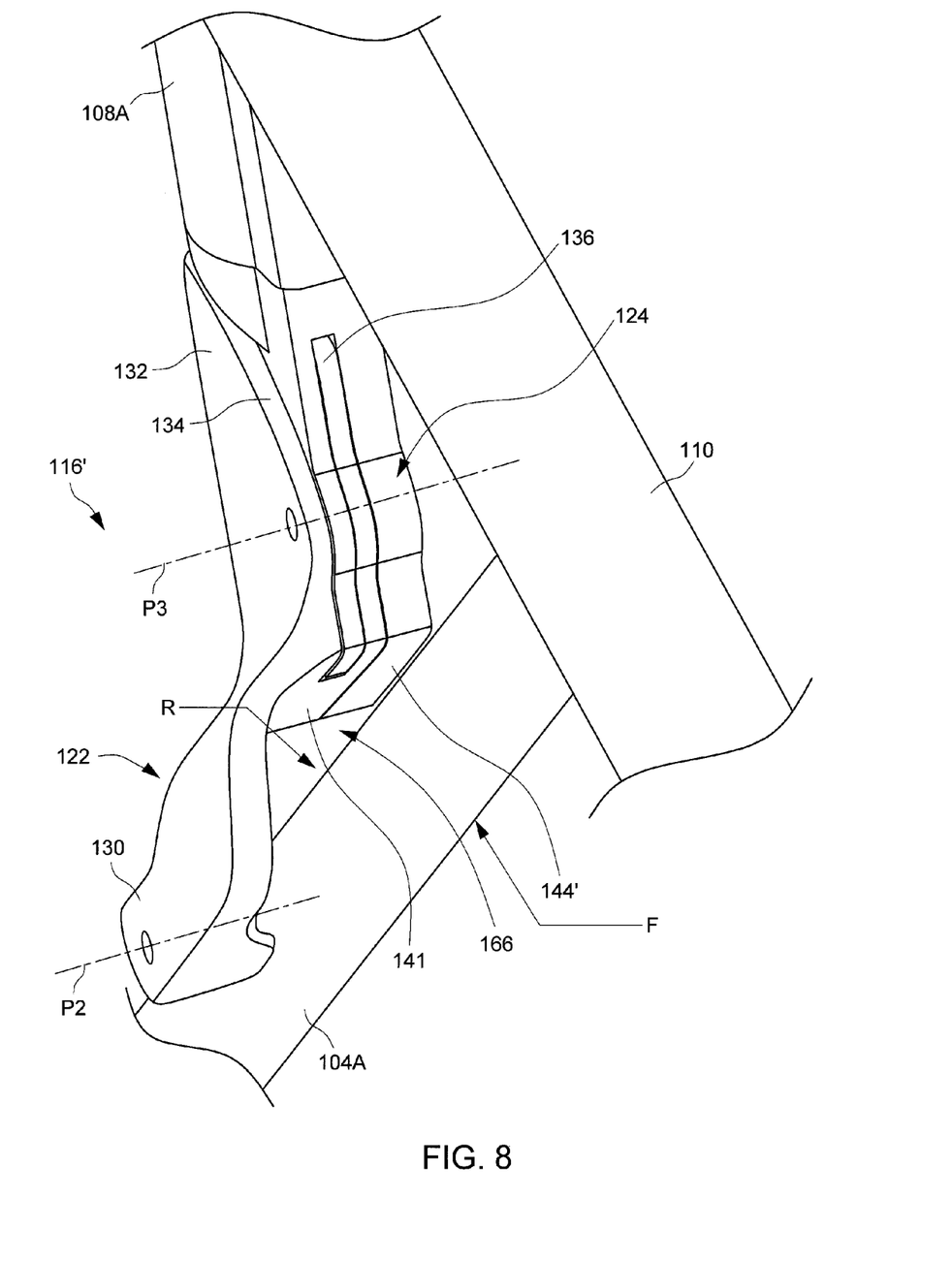
FIG. 8 is a schematic view illustrating a variant embodiment of a hinge structure implemented in the infant stroller apparatus.

FIG. 8 is a schematic view illustrating a variant embodiment of the hinge structure 116'. The hinge structure 116' can be substantially similar to the hinge structure 116 described previously including the first and second coupling parts 122 and 124, and the internal latch 126 (not shown in FIG. 8). One difference is the design of the distal end 144' of the second coupling part 124. When the infant stroller apparatus is in the deployed state, the distal end 144' may lie substantially adjacent to the wrapping surface 141, and can substantially match with the wrapping surface 141 at a position facing the rear surface R of the side segment 104A. A clearance 166 can be defined between the rear surface R of the side segment 104A at one side, and the distal end 144' of the second coupling part 124 and the wrapping surface 141 of the first coupling part 122 at the other side. The clearance 166 can be opened to the outside of the hinge structure 116', and can be sufficiently large to prevent pinching of a hand or finger.

At least one advantage of the structures described herein includes the ability to provide a hinge structure in which the internal latch can lock without interacting with the rear leg frame. Since the internal latch of the hinge structure is entirely concealed within the coupling parts, the hinge structure can be safer in use. Moreover, some embodiment of the hinge structure can also leave a relatively large clearance between the distal ends of the handle and the rear leg frame when the stroller apparatus is in the deployed state, which can prevent pinching of hand or finger.

Realizations of the infant stroller apparatuses have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
   a rear leg frame including a first side segment;
   a first coupling part pivotally connected with the first side segment about a first pivot axis, the first coupling part including a wrapping surface;
   a handle having a second side segment extending along a lengthwise axis;
   a second coupling part affixed with the second side segment and pivotally connected with the first coupling part about a second pivot axis that is spaced apart from the first pivot axis, wherein the second coupling part has a distal end; and
   a latch operable to lock the first coupling part with the second coupling part to block rotation of the second coupling part relative to the first coupling part about the second pivot axis, the latch engaging with the first coupling part at a location above the distal end;
   wherein when the stroller apparatus is in a deployed state, the wrapping surface wraps at least partially around the first side segment toward the rear surface thereof, and the distal end of the second coupling part faces a rear surface of the first side segment and has an edge that is flush with a region of the wrapping surface adjacent thereto, the distal end and the wrapping surface, and the rear surface of the first side segment opposite thereto, defining a clearance that is sufficiently large to prevent pinching of a hand or finger.

2. The infant stroller apparatus according to claim 1, wherein the first coupling part includes a stop surface, the second coupling part has an edge that comes into contact with the stop surface when the stroller apparatus is unfolded to the deployed state.

3. The infant stroller apparatus according to claim 2, wherein the contact between the stop surface and the edge of the second coupling part blocks rotation of the second coupling part about the second pivot axis in an unfolding direction.

4. The infant stroller apparatus according to claim 1, wherein the first coupling part includes a locking groove, and the latch engages with the locking groove when the stroller apparatus is in the deployed state.

5. The infant stroller apparatus according to claim 4, further including a spring operable to bias the latch in a direction for engaging with the locking groove of the first coupling part.

6. The infant stroller apparatus according to claim 1, wherein the second pivot axis is located in a region between the first pivot axis and the location where the latch engages with the first coupling part.

7. The infant stroller apparatus according to claim 1, wherein the second coupling part includes a protruding flange, and the first coupling part includes an edge that comes into contact with the flange when the stroller apparatus is in the deployed state.

8. The infant stroller apparatus according to claim 7, wherein the second pivot axis is located between the flange and the distal end along the lengthwise axis of the second side segment.

9. The infant stroller apparatus according to claim 1, further including an armrest having a rear end portion pivotally connected with the second side segment of the handle.

10. The infant stroller apparatus according to claim 9, wherein the first side segment of the rear leg frame is pivotally connected with the armrest.

11. An infant stroller apparatus comprising:
    a first frame portion including a first side segment;
    a second frame portion having a second side segment extending along a lengthwise axis; and
    a hinge structure respectively assembled with the first and second side segments, wherein the hinge structure includes:
      a first coupling part pivotally connected with the first side segment about a first pivot axis, the first coupling part having a wrapping surface;
      a second coupling part affixed with the second side segment and pivotally connected with the first coupling part about a second pivot axis that is spaced apart from the first pivot axis, wherein the second coupling part has a distal end; and
      a latch assembled with the second coupling part and operable to engage with the first coupling part to block rotation of the second coupling part relative to the first coupling part about the second pivot axis, the latch engaging with the first coupling part at a location above the distal end;
    wherein when the stroller apparatus is in a deployed state, the distal end faces a rear surface of the first side segment, and the wrapping surface wraps at least partially around the first side segment toward the rear surface thereof, the distal end and the wrapping surface, and the rear surface of the first side segment opposite thereto, defining an anti-pinch clearance.

12. The infant stroller apparatus according to claim 11, wherein the location where the latch engages with the first coupling part is located above the second pivot axis.

13. The infant stroller apparatus according to claim 11, wherein the first coupling part includes a stop surface, the second coupling part has an edge that comes into contact with the stop surface when the stroller apparatus is unfolded to the deployed state.

14. The infant stroller apparatus according to claim 11, further including a spring operable to bias the latch in a direction for engaging with the first coupling part.

15. The infant stroller apparatus according to claim 11, wherein the distal end of the second coupling part rotates away from the rear surface of the first side segment when the stroller apparatus is collapsed.

16. The infant stroller apparatus according to claim 11, wherein when the infant stroller apparatus is in the deployed state, the distal end has an edge that is flush with a region of the wrapping surface adjacent thereto.

* * * * *